Figure 1:
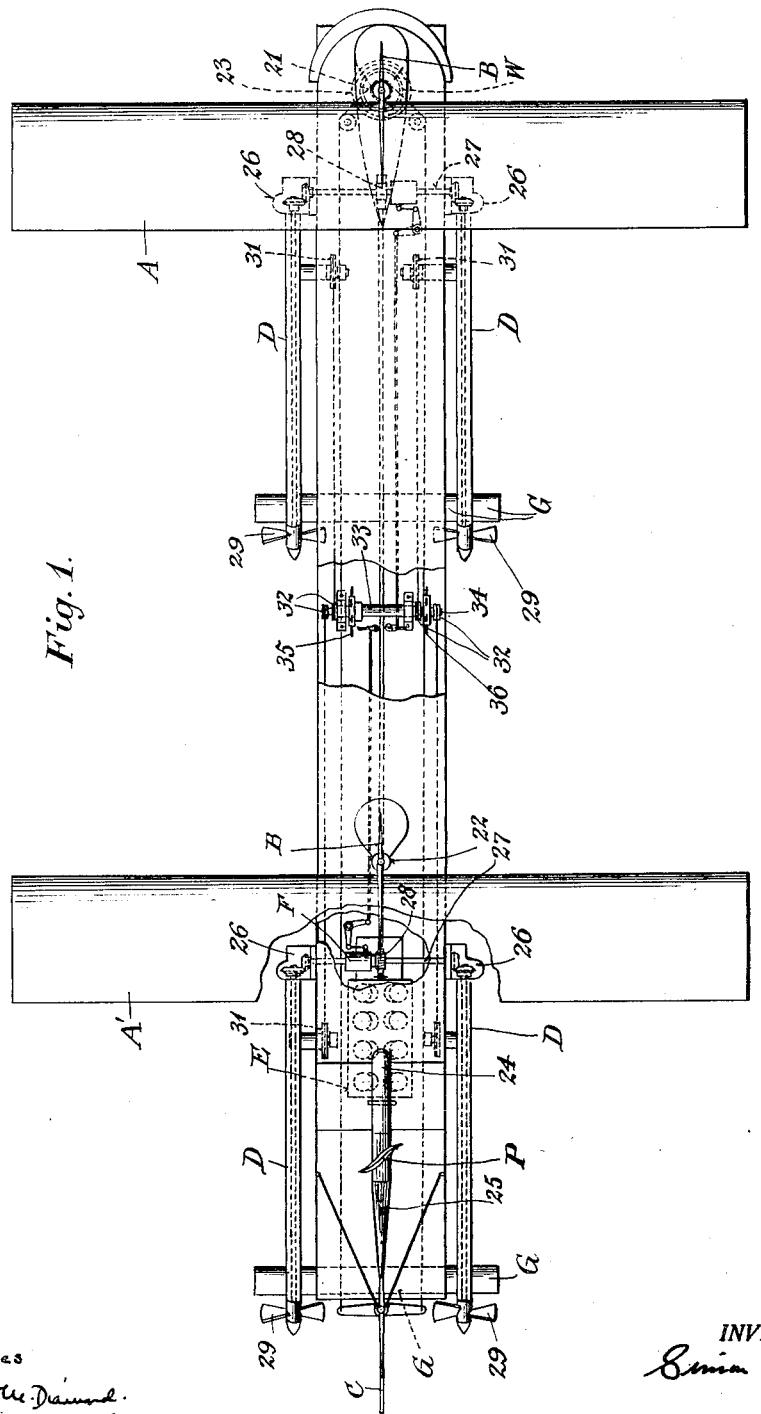

March 18, 1930.   S. LAKE   1,750,959
HYDROPLANE VESSEL
Filed Sept. 1, 1927   5 Sheets-Sheet 1

Witnesses
Herbert L. Diamond
Cecil P. Ford

INVENTOR.
Simon Lake

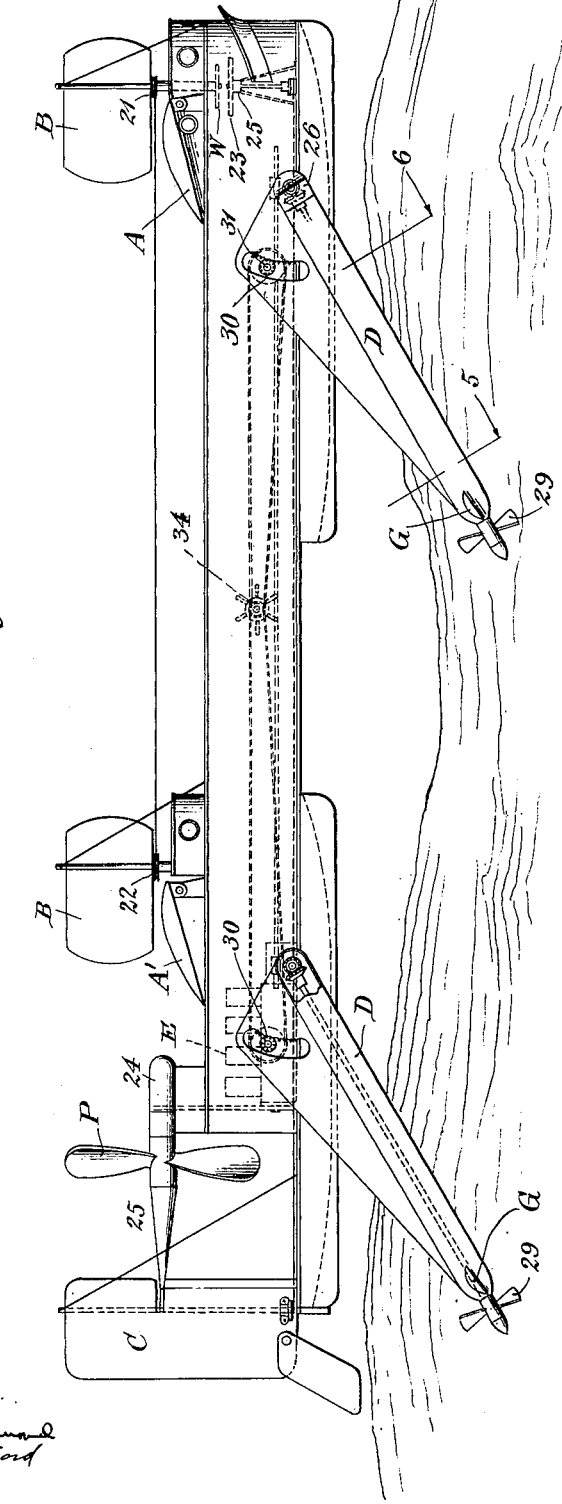

March 18, 1930.  S. LAKE  1,750,959
HYDROPLANE VESSEL
Filed Sept. 1, 1927  5 Sheets-Sheet 3
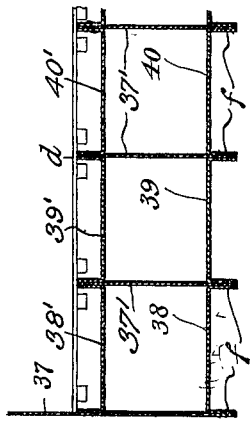
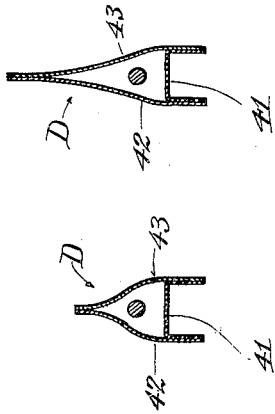
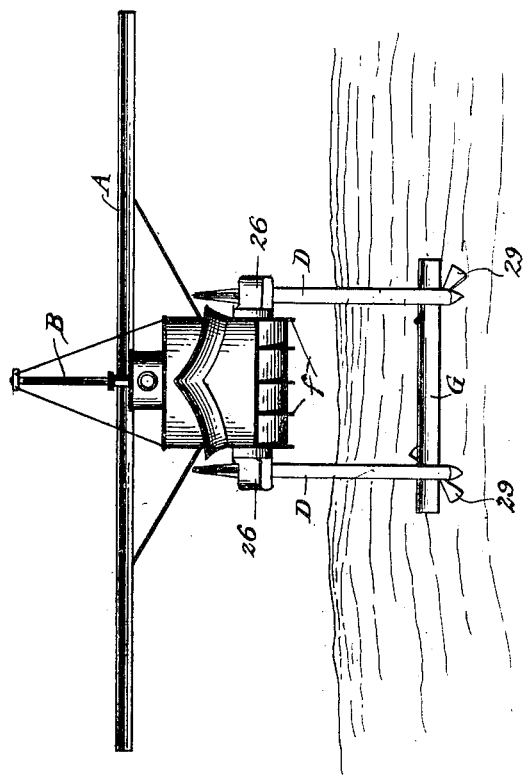
INVENTOR
Simon Lake
Witnesses.

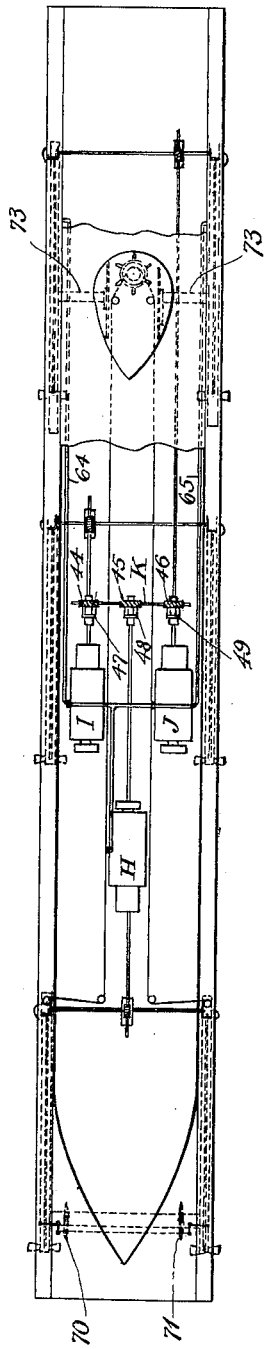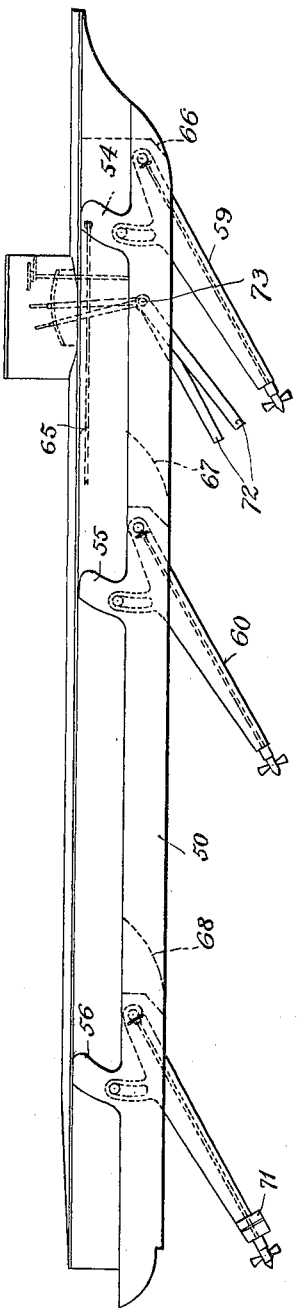

March 18, 1930. S. LAKE 1,750,959
HYDROPLANE VESSEL
Filed Sept. 1, 1927    5 Sheets-Sheet 5
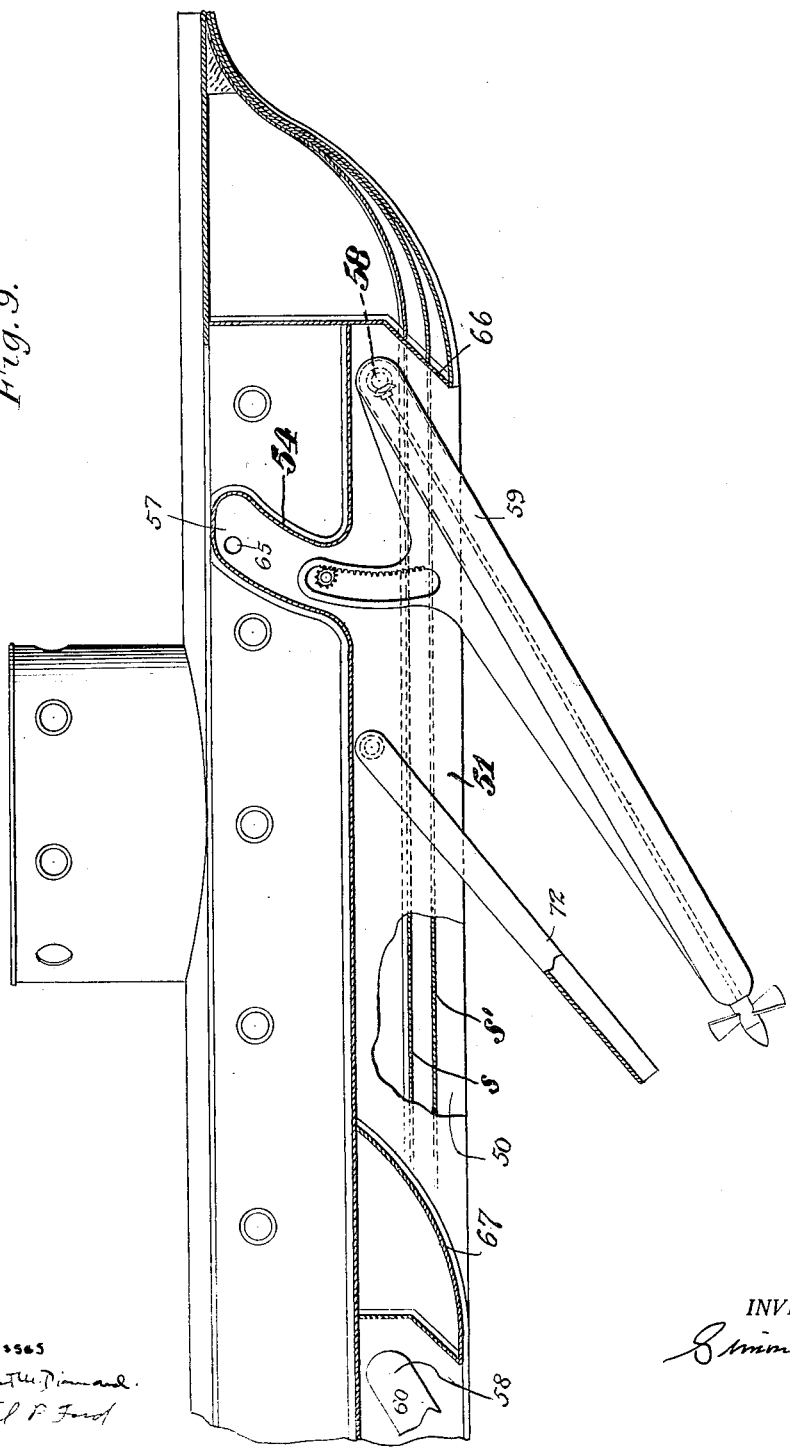
INVENTOR.
Simon Lake Patented Mar. 18, 1930

1,750,959

UNITED STATES PATENT OFFICE

SIMON LAKE, OF MILFORD, CONNECTICUT

HYDROPLANE VESSEL

Application filed September 1, 1927. Serial No. 216,869.

The object of this invention is to provide a light draft vessel which is capable of high speed and may be propelled by air-propellers when being navigated in shallow water or over land, and it is an improvement over my Patent No. 978,311 in that it provides means to navigate a vessel at high speed over rough waters by the use of submerged planes which I have found effective in submarine vessels in overcoming either negative or positive buoyancy in controlling the depth of such type of vessel.

In this case I use the submarine plane combined with aeroplanes when navigating in shoal waters and in deep water I use the angular thrust of water-propellers to project the vessel above the waves, thereby averting the shocks to which the usual so-called surface-hydroplane boats are subjected when going at speed in rough waters.

The invention includes certain structural details whereby I attain great longitudinal strength combined with light weight, which peculiar construction also makes the vessel non-sinkable by providing it with a number of water-tight compartments.

In the accompanying drawings, Fig. 1 is a plan view of my improved vessel, Fig. 2 is a side elevation of the vessel, the hull being shown riding above the waves. Fig. 3 is a bow view of the vessel also showing same riding above the waves. Fig. 4 is an enlarged view in partial cross-section showing the construction of the multiple-cell bottom of the vessel. Fig. 5 is a cross section through one of the hydroplane arms of the vessel on line 5 of Fig. 2. Fig. 6 is a similar cross section through said hydroplane arm on line 6 of Fig. 2. Fig. 7 is a plan view of a larger type of vessel (with the deck removed) in which more engines, and more propellers and hydroplanes are used, and in which the hydroplane arms and control mechanism are protected by housing them in side compartments. Fig. 8 is a side view of same. Fig. 9 is an enlarged longitudinal section of the bow portion of the vessel shown in Fig. 8.

Referring now to Fig. 1, A—A' are airplanes secured above the deck of the vessel as more clearly shown in Fig. 2 and Fig. 3. B—B are vertical vane stabilizers to hold the vessel level when it is being navigated in a side wind. Both of these stabilizers are connected together by wire ropes running around pulleys 21 and 22 in a customary manner, the forward pulley 21 being secured to a shaft on which the forward vane is mounted and which extends down through the deck where by means of a hand wheel, W, it may be set to hold the vessel to a level keel when under headway with a side wind.

C is the air-rudder controlled by the usual yoke and lines leading to the steering wheel 23 located in the forward part of the vessel. P is the air-propeller supported on a framework with a fairing cylinder 24 forward of its hub and a cone shaped extension 25 secured to the rear to reduce air resistance and prevent eddy currents of air. Hollow arms D with bevel gear housings are disposed at the opposite sides of the hull and secured thereto at their upper ends, the housings 26 being trunnioned in bearings which surround athwartship shafts 27. These athwartship shafts are driven by the engine E through the medium of worms and wheels 28 in any well known manner, the worm wheels being attached to variable speed and reverse gears F which are operated in the usual manner by the various levers shown in Fig. 1.

The propeller shafts contained within the arms D and their attached propellers 29 may be rotated by bevel gears in the housings 26. The pairs of hollow arms D act as hydroplanes and are rigidly connected together near their lower ends by cross hydroplanes G.

The hydroplane propeller arms D are raised and lowered by means of pinions 30 (see Fig. 2) which mesh in rack-segments secured to the arms D as shown. These pinions are mounted on shafts which extend through bearings attached to the sides of the vessel. Secured to these shafts are drums 31 around which wire ropes are wound and connected with other drums 32 secured to cross shafts 33 and 34. The said cross shafts are rotated in either direction by the hand wheels 35 and 36 and thus raise and lower the hydroplane arms D and submerged planes G—G simultaneously, or, by releasing the shaft 34 which runs through hollow shaft 33,—they may be raised or lowered independently.

Referring now to Fig. 4 (a partial cross section through the hull), 37 designates one of the light metallic side plates of the hull riveted or welded to light metallic longitudinal channel members 38, 39 and 40 which form the bottom of the hull and to similar channel members 38', 39' and 40' arranged below and forming a part of the deck d. These channel members are attached by riveting or welding to longitudinal plates 37' which form keelsons. These plates 37' divide the hull longitudinally into a series of airtight compartments and materially enhance the buoyancy and strength of the hull. If desired, lateral or athwartship plates, not shown, may be arranged between the plates 37' at intervals throughout the length of the hull to divide the same into a plurality of air-tight cells, thus making an exceedingly strong hull of unsinkable, cellular construction. As will be seen, the flanges of the channel members 38, 39 and 40 are turned toward the bottom of the vessel, thus forming a plurality of longitudinal fins f throughout the length of the bottom of the hull between which air may be trapped to aid in the free running of the vessel when the hull is in contact with the water.

As it is important to have good stream lines especially aft of the hydroplane arms to reduce their resistance when being driven through the water, I prefer to make the arms as shown in Figs. 5 and 6, in which 41 denotes a channel to which side plates 42 and 43 are riveted or welded.

When the vessel is under way, the open channel sides of the arms D are first presented to the water in an inclined manner, and the water is cut by projecting edges of the arms; the water coming within the edges being diverted and forced downward, the reaction to which lifts the vessel. The water which passes to either side of the arms then closes in behind them due to hydrostatic pressure. It is important that the stream lines permit the hydrostatic pressure to force the water in back of the moving arm quickly, otherwise there would be a tendency to form a vacuum back of the arm and hold the vessel back, although under certain inclinations of the arms the maintenance of a partial vacuum increases the lifting effect, and so at high speeds the stream lines must be fairly fine to avoid excessive resistance. The shape herein provided will give longer and finer stream lines the less the downward inclination of the arms, so that the greatest speed may be attained with an inclination of arm just sufficient to carry the main hull above the crest of the waves.

In Figs. 7 and 8, I have shown a larger type of vessel with multiple engines and propellers with provision for running them independently or together. H is the engine which, similarly, through the medium of the worm and wheel and athwartship shafts as previously described in relation to Fig. 1, drives the rear set of propellers. Engine I, through a similar arrangement of shafts, drives the two intermediate propellers, and engine J, drives the forward set of propellers. An athwartship shaft K is fitted with sets of spiral gears 44, 45, and 46 loosely mounted on the engine shaft so that the engine shafts may be rotated independently by means of clutches 47, 48 and 49. These shafts may be locked together in an obvious manner thus causing all the shafts to be rotated together at the same speed which is an essential requirement for steady lift and speed.

The hull of this larger vessel differs slightly from the smaller craft previously described, in that the hydroplane propeller arms are housed in compartments or well formed by bulkheads (later described) built on either side of the vessel. In still larger vessels intermediate wells and arms may also obviously be installed if desired. I also carry these wells below the central or main bottom of the hull as shown more clearly in longitudinal section in Fig. 9, in which the cellular construction of the main or inner hull is also shown clearly. This cellular construction is similar to that previously described but includes the false bottom member s which provides an air space between it and the bottom s' and at the same time aids in stiffening and strengthening the hull. 50 designates the outside plates of the vessel, which are separated from the inner side plates 51 by the bulkheads (above referred to) as shown at 54, 55 and 56, forming the compartments or wells, which wells at 57 extend up to a sufficient height to permit the geared segments of the hydroplane arms 59 and 60 pivoted at 58 to extend up sufficiently high to permit the propeller-arms to be drawn up so that the craft can be navigated as a displacement vessel.

The exhaust from the engine is carried forward through the exhaust pipes 64 and 65 and admitted into these wells where its only exit is at the bottom of the wells and thus is maintained a cushion of gas on which the vessel travels, thereby cutting down frictional resistance when the vessel is being run as a displacement craft.

Fixed step hydroplanes 66, 67 and 68 are also attached to the under part of the main hull at intervals, and act as planes to lift the vessel and provide air-pockets between them and the depending sides, as shown particularly in Fig. 9. A portion of the exhaust is permitted to escape into the air-pockets through small holes (not shown) leading from the side exhaust chambers; but much of the air comes in under the bow contained in the form of air bubbles in the broken water which is caused by the water's forcible contact against the ribbed surface of the bow.

As the vessel must first be started as a displacement craft until a sufficient speed is attained for the comparatively small area of the hydroplanes to lift the vessel clear of the surface of the water, the above provision for propelling the vessel first on a film of air is an important feature.

I have shown two rudders 70 and 71 mounted in the rear, athwartship hydroplane which extends between the rear hydroplane propeller-arms; these rudders being operated in the usual manner from a steering gear located in the pilot house by means of connecting rods and bell cranks which are indicated in Fig. 7.

72 are stabilizers which consist of inverted channels secured to rocker shafts 73, which may be independently operated in any suitable manner to depress or raise the stabilizing members, to offset side wind pressure.

Changes may be made in the form of hull and details of mechanism shown and described herein without departing from the spirit of the invention or the scope of the following claims.

I claim:

1. A motor boat comprising a hull, a hydroplane arm attached to said hull, a propeller shaft supported by said hydroplane arm, means for rotating said propeller shaft and means for depressing the propeller end of said hydroplane arm.

2. A motor boat comprising a hull, hydroplane arms attached to said hull, propeller shafts supported by said hydroplane arms, means for rotating said propeller shafts, and means for depressing the propeller-ends of said hydroplane arms.

3. A motor boat comprising a hull, an athwartship shaft, a motor for rotating said shaft, longitudinal hydroplane arms carried by the hull, propeller shafts operatively connected with said athwartship shaft and supported by said hydroplane arms and means for raising and lowering said hydroplane arms.

4. A motor boat comprising a hull, hydroplane arms arranged longitudinally of the sides of the hull and each attached at one end to said hull, athwartship hydroplanes connecting said arms below the hull of the boat, and means to raise and lower said planes.

5. A motor boat comprising a hull, submergible hydroplane arms pivotally attached to the hull and extending longitudinally thereof and operative to project and support the hull above the surface of the water, and submergible lateral planes extending between and connecting said longitudinal hydroplane arms.

6. A motor boat comprising a hull, a plurality of submergible side-hydroplane arms on said hull and extending below said hull, athwartship submergible hydroplanes connecting said arms, propeller shafts disposed within said side-hydroplane arms, means for raising and lowering said hydroplane arms, and means to rotate said propeller shafts.

7. A motor boat comprising a hull, side hydroplane arms attached to the hull and having water cutting flanges carried by and projecting below them and means to raise and lower said arms.

8. A motor boat comprising a hull, side hydroplane arms attached to the hull and having water-cutting flanges projecting below them, said hydroplane arms having their upper portions formed to constitute fairwaters.

9. A motor boat comprising a hull, a plurality of hollow side hydroplane arms with projecting flanges on their water-contact sides, propeller shafts housed within said arms, and fairwaters formed at the backs of said arms.

10. A motor boat comprising a hull, a plurality of submergible hydroplane arms, propeller shafts housed within said hydroplane arms, rudders attached to the hydroplane arms, and means for controlling said rudders.

11. A motor boat comprising a hull having longitudinal bulkheads, channel members interposed between same and forming the deck and bottom of the hull and providing watertight compartments within the hull, the channel members forming the bottom having water-cutting side flanges projecting below the bottom of the hull.

12. A motor boat comprising a hull having a bottom made of channel members the flanges of which extend downward, and having side plates which extend below the edges of the flanges of the bottom channel members, and fixed inclined hydroplanes extending athwartship between said side plates and placed at intervals between the bow and stern of the boat and forming air traps for the purpose herein described.

13. A motor boat comprising a hull having compartments disposed at its opposite sides, said compartments having open bottoms providing housing-spaces for depressible hydroplanes, and means for introducing air and exhaust gases from the engines into said compartments to expel the water therefrom for the purpose specified.

14. A motor boat comprising a hull, submergible hydroplane side arms, a submergible athwartship hydroplane connected to said side arms, propeller shafts housed within said hydroplane arms, a rudder attached to said athwartship hydroplane, means for depressing and elevating said arms simultaneously, and auxiliary stabilizing hydroplanes operable independently of each other.

In testimony whereof I have hereunto set my hand this 30th day of August, A. D. 1927.

SIMON LAKE.